US006321069B1

(12) United States Patent
Piirainen

(10) Patent No.: US 6,321,069 B1
(45) Date of Patent: Nov. 20, 2001

(54) ARRANGEMENT FOR REDUCING INTERMODULATION DISTORTION OF RADIO FREQUENCY SIGNALS

(75) Inventor: Risto Piirainen, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/202,809

(22) PCT Filed: Apr. 28, 1998

(86) PCT No.: PCT/FI98/00368

§ 371 Date: Dec. 22, 1998

§ 102(e) Date: Dec. 22, 1998

(87) PCT Pub. No.: WO98/52291

PCT Pub. Date: Nov. 19, 1998

(30) Foreign Application Priority Data

Apr. 30, 1997 (FI) ..................................................... 971850

(51) Int. Cl.[7] ........................................................ H04B 1/40

(52) U.S. Cl. .............................. 455/82; 455/114; 333/204

(58) Field of Search .................................. 455/114, 121, 455/129, 78, 82, 83; 333/204

(56) References Cited

U.S. PATENT DOCUMENTS

| | | | | |
|---|---|---|---|---|
| 4,001,711 | | 1/1977 | Knutson et al. . | |
| 4,418,972 | | 12/1983 | Benasutti . | |
| 4,480,240 | | 10/1984 | Gould . | |
| 4,609,892 | * | 9/1986 | Higgins, Jr. | 333/204 |
| 4,764,684 | | 8/1988 | Fiorina et al. . | |
| 4,785,271 | * | 11/1988 | Higgins, Jr. | 333/204 |
| 5,023,866 | | 6/1991 | DeMuro . | |
| 5,343,176 | * | 8/1994 | Hasler | 333/204 |
| 5,355,524 | * | 10/1994 | Higgins, Jr. | 455/82 |
| 5,408,206 | * | 4/1995 | Turunen et al. | 333/204 |
| 5,783,976 | * | 7/1998 | Furutani et al. | 333/134 |

OTHER PUBLICATIONS

A photocopy of the International Search Report for PCT/FI98/00368.

* cited by examiner

*Primary Examiner*—Edward F. Urban
(74) *Attorney, Agent, or Firm*—Altera Law Group, LLC

(57) ABSTRACT

The invention relates to an arrangement for radio frequency signals particularly in a duplex filter summing part comprising a conductive housing and at least one common transmission line for at least two different signals. In order to reduce intermodulation distortion of signals, which arises in the summing part, the housing of the summing part is arranged to function as a ground plane for the transmission line without the ground plane of a printed board or a ground plane otherwise connected to the transmission line.

3 Claims, 1 Drawing Sheet

ARRANGEMENT FOR REDUCING INTERMODULATION DISTORTION OF RADIO FREQUENCY SIGNALS

FIELD OF THE INVENTION

The invention relates to an arrangement for reducing interference of radio frequency signals particularly in a transceiver summing part comprising a conductive housing and at least one common transmission line for at least two different signals.

DESCRIPTION OF THE PRIOR ART

In a radio system, in the radio frequency parts of a transceiver, for example in a duplex filter, intermodulation arises particularly between several different signals to be transmitted, the intermodulation being caused by non-linear interfaces or ferromagnetic materials on a signal path. The non-linear interface creates various entry combinations of signals, whereby sum and beat frequencies of frequencies in the signals are generated. Some of these frequencies may appear on a transmission channel or on a reception channel, whereby they interfere with a transmission and/or reception operation and are harmful to the operation of the entire radio system.

The non-linear interface is formed, for example, by the coupling between the ground plane of a printed board arranged in a transmission line and the ground plane of a housing. The purpose of the ground plane of the printed board is to reduce interference, but the coupling to the housing causes intermodulation of signals. A non-linear effect is amplified if the coupling between ground surfaces is weak. In order to avoid non-linear effects, it is known to strengthen the coupling between the ground plane of the printed board and the housing by securing a plate to the housing with screws, whereby the ground surface of the plate is tightly pressed against the housing. Coupling can be further improved by using conductive paste or glue between the ground plane of the printed board and the housing. However, these means do not entirely remove the non-linear interface between the ground surfaces and do not therefore solve the problem produced by intermodulation of signals.

BRIEF DESCRIPTION OF THE INVENTION

An object of the invention is to provide a method and an apparatus implementing the method so as to solve the above mentioned problems. This is achieved by the method of the type presented in the introduction, characterized in that, in order to reduce intermodulation distortion of signals, which arises in the summing part, the housing of the summing part is arranged to function as a ground plane for the transmission line without a separate ground plane connected to the transmission line. The preferred embodiments of the invention are disclosed in the dependent claims.

The arrangement of the invention provides many advantages. Intermodulation interfering with the operation of the transceiver and arising from a transmission signal in a non-linear coupling can be removed, and the quality of the reception in particular and the operation quality of the radio system on the whole can thus be improved.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

The solution of the invention can be applied particularly to a transceiver in a cellular radio system without, however, being restricted to it.

Figure 1:
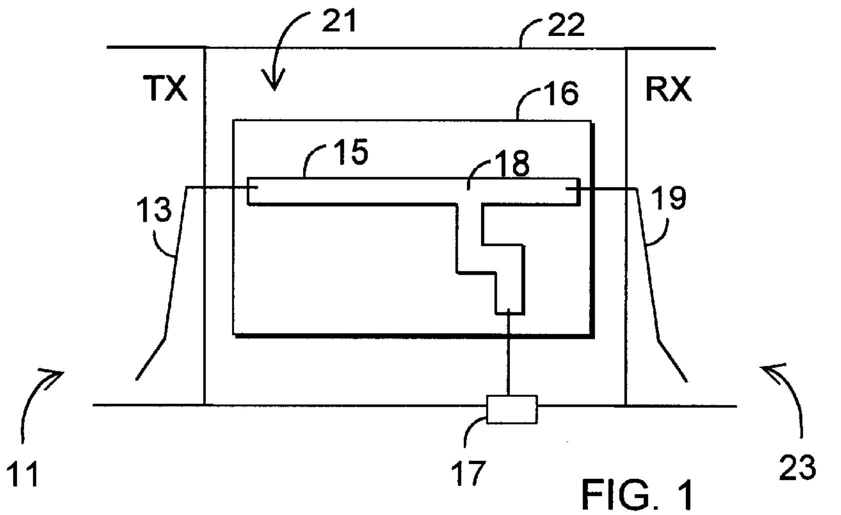
FIG. 1 presents coupling of a transmitter and a receiver to an antenna.

FIG. 1 shows a typical transceiver arrangement functioning as a filter and comprising a transmitter filter 11, a summing part 21 and a receiver filter 23. From the transmitter filter 11 is arranged a conductor 13 to the summing part 21. The summing part 21 comprises a transmission line 15, a printed board 16 and an antenna plug 17. A received signal propagates to the receiver filter 23 via a conductor 19. The transmitter filter 11 prevents the reception signals from entering a transmitter, and the receiver filter 23 prevents transmission signals from entering a receiver. The length of the conductor 13 between the transmitter filter 11 and the summing part 21 is then effectively equal to the length of half of the wavelength of the reception signals, i.e. $l=n*\lambda/2$, where l is the length of the conductor, n is an integer (1, 2, 3, . . . ), $\lambda$ is the wavelength. Correspondingly, the length of the conductor 19 between the receiver filter 23 and the summing part is effectively equal to the length of the wavelength of the transmission signal. However, such filtering can neither filter off intermodulation frequencies present in the transmission signals and generated in the summing part 21 nor prevent them from propagating to the receiver. The arrangement of the invention is preferably a transceiver arrangement for a base station in a radio system, and it is used for transmitting simultaneously at several frequencies.

The whole arrangement is typically inside a conductive housing 22 enclosing the summing part 21 as a separate compartment. The housing is typically made of metal or of combinations thereof, such as silver-coated aluminium. The signals have a summing point 18 at a transmission line architecture 15 at a location where a transmitter branch, a reception branch and an antenna branch meet. The impedance of the transmission line 15 is typically 50Ω. The transmission line 15 is a thin and conductive planar wave guide on the printed board 16 which is typically double-sided in prior art solutions. The transmission line 15 is, for example, a metal microstrip conductor, the thickness of which typically ranges from a couple of micrometers to a few dozen micrometers. The printed board 16 typically functions as a substratum of the transmission line 15 and is commonly made of a mixture of resin/fibre glass, plastics or a ceramic substance. The microstrip conductors must be paired with a ground plane composed of the side of the two-sided printed board 16 facing the transmission line 15 and being typically a large metal surface whose purpose is to create the required impedance to the microstrip and to reduce scattered radiation. The printed board 16 is firmly secured to the housing structure 22 for example with screws, whereby the housing 22, which also functions as a ground plane, and the ground plane of the printed board are coupled together. Although the purpose of the ground plane of the printed board 16 is to reduce interference, coupling the ground plane to the housing structure 22 forms an interface which operates non-linearly as regards signals propagating in the transmission line 15 and generates intermodulation between the signals.

In its general form, intermodulation generates frequencies of the form $IM\hat{=}a*f_1\pm b*f_2$ for two frequencies $f_1$ and $f_2$. Typical intermodulation frequencies are for example $IM_3$, $IM_5$ and $IM_7$ that are generated for the two frequencies $f_1$ and $f_2$ in the following way:

$$IM_3\hat{=}2f_1\pm f_2$$

$$IM_5\hat{=}3f_1\pm 2f_2$$

$$IM_7\hat{=}4f_1\pm 3f_2.$$

The summed-up frequencies are commonly so high that they are filtered off at the transceiver. The frequency range of, for example the NMT radio system is 450 MHz, and the base station receives, for example in a frequency band of 453–457.5 MHz and transmits in a frequency band of 463–467.5 MHz. $IM_5$ and $IM_7$ then appear at reception frequencies, and $IM_3$ appears in a transmission band. For example, when two frequencies to be transmitted are 463 MHz and 467 MHz, $IM_5$ receives a value 3*463 MHz–2*467 MHz=455 MHz, which is in the middle of the reception frequency band.

Figure 2:
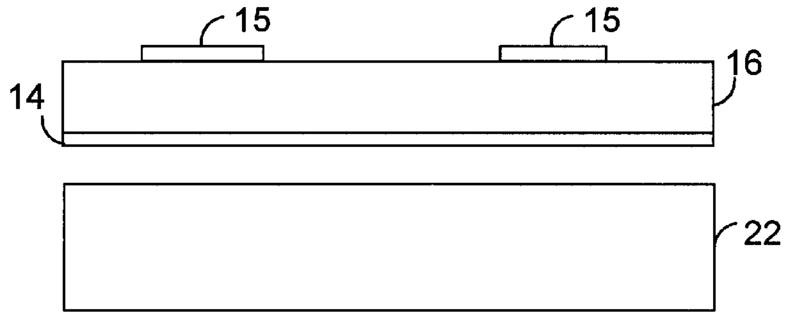
FIG. 2 PRIOR ART
FIG. 2 presents the prior art printed board of a summing part.

FIG. 2 shows a typical prior art switching circuit 16 of a transmission line 15 arranged in a summing part 21. The transmission line 15 is arranged on one side of the printed board 16, and the other side of the printed board 16 preferably functions entirely as a conductive ground plane 14. In other words, the ground plane 14 is separate from a housing structure 22 and connected to the transmission line 15 by means of the printed board 16. The ground plane 14 of the printed board 16 is usually coupled to the filter housing 22 by pressing, by using conductive paste or by glueing.

The solution of the invention relates particularly to the summing part 21, where, in order to reduce intermodulation distortion of signals, which is generated in the summing part, the housing 22 of the summing part 21 is arranged to function as the ground plane for the transmission line 15 without a separate ground plane connected the transmission line 15. Although in prior art solutions a separate ground plane, such as the ground plane 14 of the printed board, is used with the transmission line 15, for example below the substratum in order to generate impedance and also to control interference, the decision in the inventive solution is to remove the ground plane 14 particularly used with the transmission line 15 and to rely upon the housing structure 22 functioning as the ground plane. In other words, the housing 22 causing interference and the ground plane of the transmission line 15 do not need to be coupled together, and interference arising from the coupling is avoided.

In the solution of the invention, the summing part 21 comprises a printed board 16 comprising at least one transmission line 15 for at least two different signals, and, in order to reduce intermodulation distortion of signals, which is generated in the summing part 21, the printed board 16 is one-sided, and the housing 22 of the summing part 21 is arranged to function as a ground plane without a separate ground plane arranged on the printed board 16. Both in the prior art solution and in the inventive solution, the transmission line 15 is on the printed board 16, but the prior art ground plane, which is arranged in connection with the transmission line 15 and functions as the ground plane 14 of the printed board 16, is not employed in the inventive idea.

Figure 3:
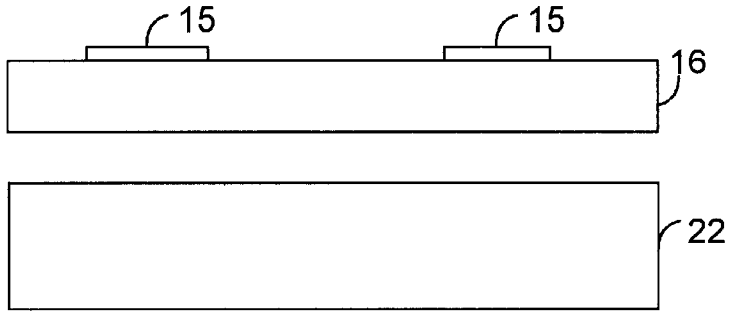
FIG. 3 presents the printed board of a summing part of the invention.

FIG. 3 shows a printed board solution of the invention. A conductive layer is in that case excluded from the side of the printed board 16 facing the transmission line 15, whereby the printed board 16 does not have a ground plane 14 of its own. However, the printed board 16 is secured to the housing 22 in accordance with a known technique for example with screws. When the ground planes of the printed board 16 and the housing 22 are not coupled together, intermodulation distortion arising in the prior art solutions disappears.

Figure 4:
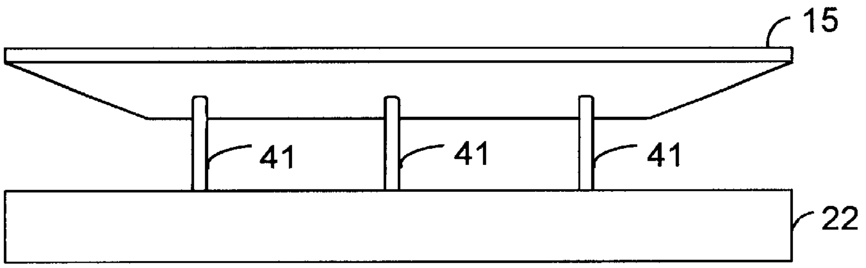
FIG. 4 presents the transmission line solution of a summing part of the invention.

FIG. 4 shows a second operation mode of the invention. An actual printed board is in that case not employed in a summing part 21, but a transmission line 15 is air-insulated from a ground plane provided by a housing 22. The transmission line 15 can be, for example, a metal strip conductor kept apart from the housing 22 with supports 41. The transmission line 15 is substantially fully air-insulated from the housing 22 of the summing part 21, the housing being arranged to function as the ground plane.

In the solution of the invention, the summing part 21 is preferably part of a duplex filter in accordance with the prior art. The duplex filter enables simultaneous transmission and reception of signals by the transceiver.

Although the invention is described above with reference to the example according to the accompanying drawings, it is obvious that the invention is not restricted thereto, but it can be modified in a variety of ways within the scope of the inventive idea disclosed in the attached claims.

What is claimed is:

1. An arrangement for reducing interference of radio frequency signals in a transceiver summing part, comprising:

a conductive housing; and at least one common transmission line in the summing part for carry at least two different signals, wherein the housing of the summing part is arranged to function as the only ground plane for the transmission line, without a separate ground plane being electrically coupled to the transmission line and arranged on a printed board, in order to reduce intermodulation distortion of signals which arises in the summing part, wherein the summing part comprises the printed board including the at least one common transmission line for at least two different signals; and in order to reduce intermodulation distortion of signals, which arises in the summing part, the printed board is one-sided; and the transmission line is formed on the one side.

2. An arrangement as claimed in claim 1, wherein:

the transmission line is substantially fully air-insulated from the housing of the summing part, the housing being arranged relative to the transmission line to function as the sole ground plane for the transmission line.

3. An arrangement as claimed in claim 1, wherein the summing part is part of a duplex filter in the transceiver.

* * * * *